United States Patent
Poplin et al.

(10) Patent No.: US 10,757,324 B2
(45) Date of Patent: Aug. 25, 2020

(54) TRANSFORM PROCESSORS FOR GRADUALLY SWITCHING BETWEEN IMAGE TRANSFORMS

(71) Applicant: SEMICONDUCTOR COMPONENTS INDUSTRIES, LLC, Phoenix, AZ (US)

(72) Inventors: Dwight Poplin, Corvallis, OR (US); Paul Anthony Chenard, Corvallis, OR (US); Giridhar Venkat, San Jose, CA (US); John Walter Neave, Fremont, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 124 days.

(21) Appl. No.: 16/053,992

(22) Filed: Aug. 3, 2018

(65) Prior Publication Data
US 2020/0045228 A1    Feb. 6, 2020

(51) Int. Cl.
G06K 9/00      (2006.01)
H04N 5/232     (2006.01)
G06T 5/00      (2006.01)
G06T 3/40      (2006.01)

(52) U.S. Cl.
CPC ....... H04N 5/23235 (2013.01); G06T 3/4007 (2013.01); G06T 5/006 (2013.01)

(58) Field of Classification Search
None
See application file for complete search history.

(56) References Cited

U.S. PATENT DOCUMENTS

| 8,270,763 B2 | 9/2012 | Huggett |
| 9,697,591 B2 | 7/2017 | Paik et al. |
| 2002/0118751 A1* | 8/2002 | Akiyoshi ............. G06T 3/4007 375/240.12 |

(Continued)

FOREIGN PATENT DOCUMENTS

| CN | 102156970 | 8/2011 |
| CN | 102378010 | 3/2012 |

(Continued)

Primary Examiner — Hadi Akhavannik
(74) Attorney, Agent, or Firm — Treyz Law Group, P.C.; David K. Cole

(57) ABSTRACT

An imaging system may include transform circuitry to transform a captured input image into desired output images. In some applications, it may be desired to transition between a first output image and a second output image that have been respectively produced using first and second transforms. To perform this transition gradually, the transform circuitry may include a transform processor and an interpolation processor that produce discrete intermediate output images between the first output image and the second output image. The transform processor may generate a set of individual transforms between the first transform and the second transform or may interpolate between the first transform and the second transform to produce interpolated transforms. In either case, the transform circuitry may produce the intermediate output images using the produced transforms, and the output images may be output in a continuous stream to gradually transition between the first and second output images.

19 Claims, 7 Drawing Sheets

(56) References Cited

U.S. PATENT DOCUMENTS

| | | | |
|---|---|---|---|
| 2002/0126917 A1* | 9/2002 | Akiyoshi | G06T 3/4007 382/300 |
| 2003/0095202 A1 | 5/2003 | Ferguson | |
| 2004/0264809 A1* | 12/2004 | Uetani | G06T 3/4007 382/300 |
| 2005/0001930 A1 | 1/2005 | Mao | |
| 2007/0285430 A1* | 12/2007 | Barone | G06T 15/005 345/545 |
| 2009/0296814 A1* | 12/2009 | Lin | H04N 19/52 375/240.16 |
| 2009/0322661 A1* | 12/2009 | Bae | G09G 3/3648 345/87 |
| 2010/0002070 A1* | 1/2010 | Ahiska | G08B 13/19691 348/36 |
| 2010/0103089 A1* | 4/2010 | Yoshida | G09G 3/2022 345/102 |
| 2010/0119172 A1 | 5/2010 | Yu et al. | |
| 2011/0002532 A1 | 1/2011 | Frakes et al. | |
| 2011/0157315 A1 | 6/2011 | Bennett et al. | |
| 2012/0026390 A1* | 2/2012 | Matsuhira | G06T 3/4007 348/441 |
| 2013/0223762 A1* | 8/2013 | Nagamasa | G06T 5/00 382/293 |
| 2015/0163380 A1 | 6/2015 | Hickerson | |
| 2017/0024846 A1* | 1/2017 | Nash | G06F 3/04842 |
| 2017/0041538 A1* | 2/2017 | Choi | G06T 3/0062 |

FOREIGN PATENT DOCUMENTS

| | | |
|---|---|---|
| CN | 104182961 | 12/2014 |
| WO | 1993015586 | 8/1993 |
| WO | 2001074082 | 10/2001 |

\* cited by examiner

TRANSFORM PROCESSORS FOR GRADUALLY SWITCHING BETWEEN IMAGE TRANSFORMS

BACKGROUND

This relates generally to imaging devices, and more particularly, to imaging devices that utilize spatial transforms.

Image sensors are commonly used in electronic devices such as cellular telephones, cameras, and computers to capture images. In a typical arrangement, an electronic device is provided with an image sensor having an array of image pixels and a lens to focus light onto the array of image pixels, which may be used to produce image data. Depending on the lens and image sensor settings that are used, a digital image generated using the image data may have a distorted appearance. It may be desirable to process the image data to reduce or remove this apparent geometric distortion.

Conventional imaging systems typically employ processors that transform the image data produced by the image sensor to produce output images in which the distortion in a portion of the original digital image is reduced or removed. In order to reduce or remove the distortion in different portions of the original digital image, different transforms may need to be applied to the image data. Conventional imaging systems, however, are unable to gradually transition between output images that correspond to different image transforms.

It would therefore be desirable to be able to provide imaging devices with improved transform processors.

DETAILED DESCRIPTION

Embodiments of the present invention relate to imaging systems with processors capable of performing gradual image transform operations.

Electronic devices such as digital cameras, computers, cellular telephones, video cameras, security cameras, and other electronic devices include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Electronic devices may have processing circuitry that is configured to perform imaging operations on the images captured by the image sensors. For example, the processing circuitry may transform the images to present various views to a user of the electronic device. The electronic devices may be provided with transform circuitry that may gradually switch between different transform views.

Figure 1:
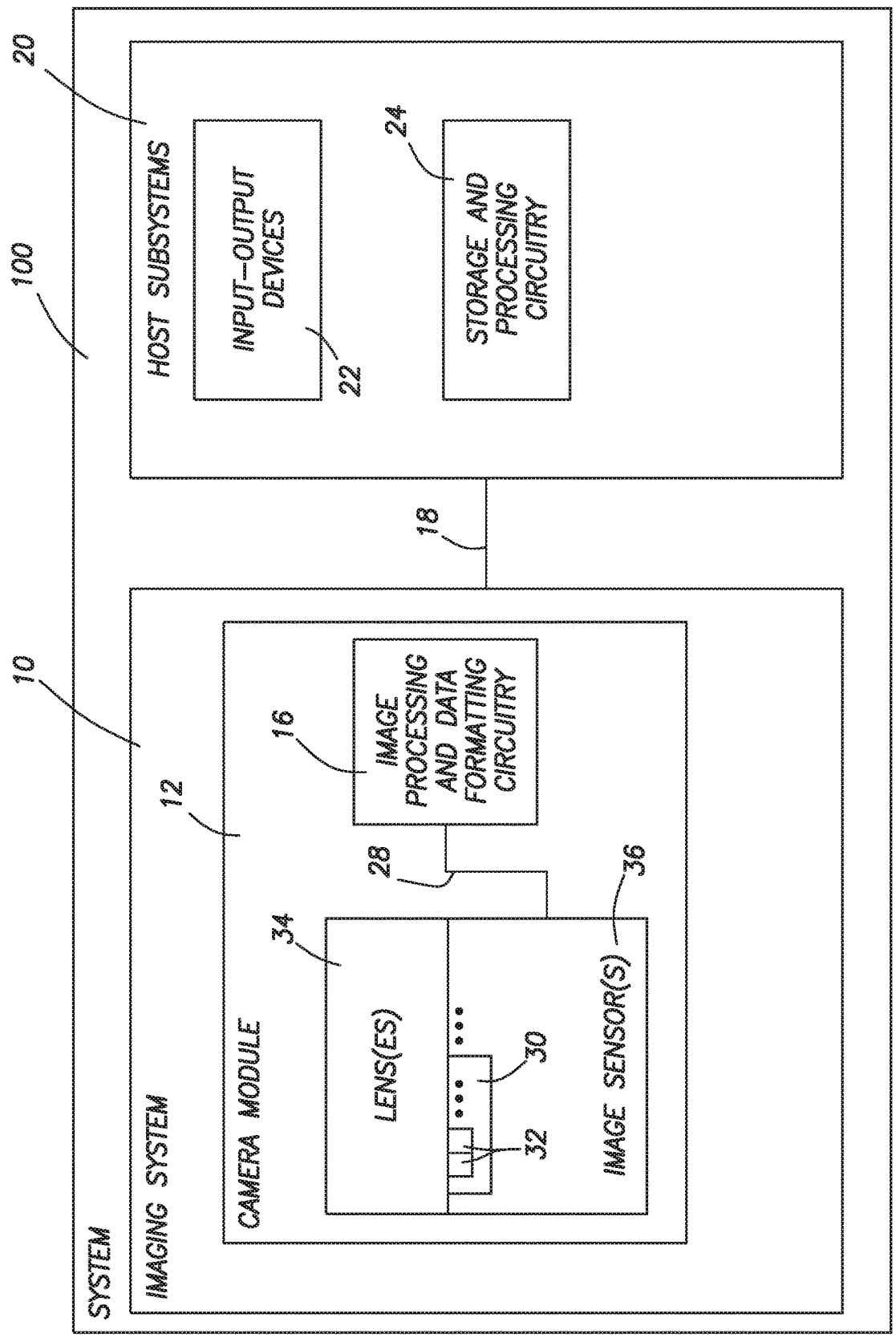
FIG. 1 is a diagram of an illustrative electronic device having an imaging system in accordance with an embodiment.

FIG. 1 is a diagram of an illustrative imaging and response system including an imaging system that uses image sensors to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system, as examples.

As shown in FIG. 1, system 100 may include an imaging system such as imaging system 10 and host subsystems such as host subsystem 20. Imaging system 10 may include camera module 12. Camera module 12 may include one or more image sensors 36 and one or more lenses 34.

Each image sensor in camera module 12 may be identical or there may be different types of image sensors in a given image sensor array integrated circuit. During image capture operations, each lens 34 may focus light onto an associated image sensor 36 or each lens 34 may focus light onto multiple image sensors 36. Image sensors 36 may each include one or more arrays 30 of photosensitive elements (i.e., pixels 32) that convert the light into digital data. Image sensors may have any number of pixels (e.g., hundreds, thousands, millions, or more). Pixels 32 may sometimes be referred to herein as image pixels 32 or image sensor pixels 32. A typical image sensor may, for example, have millions of pixels (e.g., megapixels). Image pixels 32 may be formed in a semiconductor substrate using complementary metal-oxide-semiconductor (CMOS) technology or charge-coupled device (CCD) technology or any other suitable photosensitive devices. Image pixels 32 may be frontside illumination (FSI) image pixels or backside illumination (BSI) image pixels.

Still and video image data from image sensors 36 may be provided to image processing and data formatting circuitry 16 via path 28. Image processing and data formatting circuitry 16 may be used to perform image processing functions such as data formatting, adjusting white balance and exposure, implementing video image stabilization, face detection, image transform operations, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 36 and image processing and data formatting circuitry 16 are implemented on a common semiconductor substrate (e.g., a common silicon image sensor integrated circuit die). If desired, camera sensor 36 and image processing circuitry 16 may be formed on separate semiconductor substrates. For example, camera sensor 36 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing hardware or software for detecting objects in images, detecting motion of objects between image frames, determining distances to objects in images, filtering, transforming, or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

If desired, image processing and data formatting circuitry 16 or storage and processing circuitry 24 may be capable of transforming the still and video image data from image sensors 36. It may be desirable to apply image transforms to images captured by camera module 12 when wide-angle or fisheye lenses are used, for example. Wide-angle lenses generally produce a warped image that has strong visual distortion (e.g., geometric distortion, radial distortion, or barrel distortion). Processing circuitry may transform the image data produced by an image sensor having a wide-angle or fisheye lens to de-warp the data and create a flat, undistorted image. The data may be de-warped by selecting a portion of an input image captured through a wide-angle lens and remapping the curved portions to appear straight. In this way, a warped image can be processed to appear as if it were captured using a conventional (e.g., rectilinear or standard) lens. However, similar processes may be performed by the processing circuitry regardless of the lens type used (e.g., the processing circuitry may be used to reduce the amount of distortion the image data produced by a lens that outputs a flat image). Image processing circuitry 16 and processing circuitry 24 are not limited to performing de-warping operations. In general, any transform may be performed on generated image data, including rotating, scaling, panning, tilting, or zooming the image data.

Figure 2:
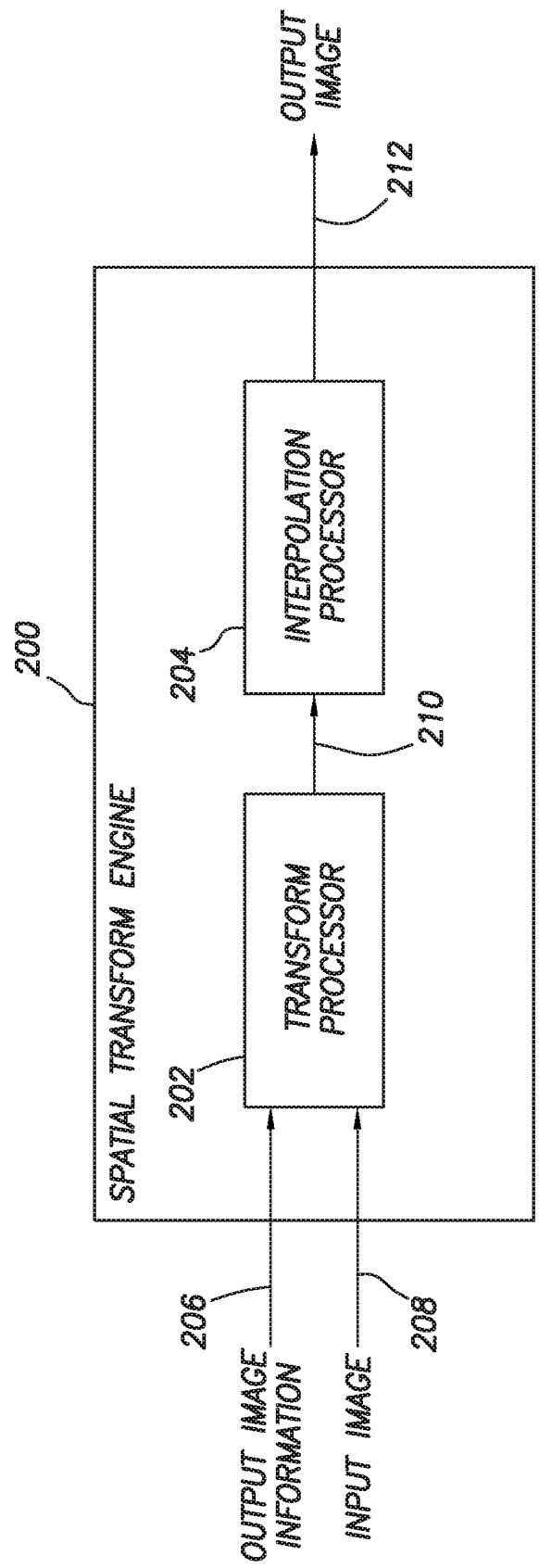
FIG. 2 is a schematic diagram of an illustrative spatial transform processor that may be used to implement image transform operations on an input image to produce an output image in accordance with an embodiment.

FIG. 2 is an example of a spatial transform engine (also referred to as a transform engine herein) that may be capable of transforming generated image data. Spatial transform engine 202 may be included in one or both of image processing circuitry 16 and processing circuitry 24, if desired. As shown in FIG. 2, spatial transform engine 200 may include transform processor 202 and interpolation processor 204. Transform processor 202 may receive output image information over path 206 and an input image over path 208. The input image may be produced by image sensor 36 or may be received from an external source. The output image information may be generated by processing circuitry 16 or processing circuitry 24 based on a desired image transformation. For example, the output image information may indicate to transform processor 202 whether de-warp-ing, rotating, zooming, or any other image transform is desired. Processing circuitry 16 or 24 may generate the output image information provided over path 206 based on information provided by a user of an electronic device, based on predetermined settings of the electronic device, or based on any other desired parameters.

Transform processor 202 may gather desired image data from the input image based on the output image information. In particular, transform processor 202 may use a spatial transform to map a set of points from the input image (e.g., a distorted image) to an output image. The transform used by transform processor 202 may be generated according to equation (1):

$$A(x_o, y_o) = F(x_i, y_i, \text{lens\_distortion}, \text{zoom}, \text{rotation}, \text{pan}) \quad (1)$$

where A is a two dimensional set of coordinates that defines each pixel in the output image in terms of its location in the input image (e.g., a transform), $x_o$ and $y_o$ are the horizontal and vertical locations of a pixel in the output image, and F is a function that maps each output coordinate ($x_o$, $y_o$) to an input coordinate ($x_i$, $y_i$) based on the distortion of the lens and the desired zoom, rotation, and pan. In general, the distortion of the lens may be defined by a distortion equation that is predetermined based on the properties of the lens. Function F may be stored as a look-up table that provides known relationships between the desired output image and the input image. For example, function F may provide a one-to-one relationship to map each desired output location directly to a location in the input image. However, this is merely an example. In general, any type of transform may be used, including parametric transforms (e.g., transforms that parametrically store properties of a wide-angle lens).

In general, the location in the input image that corresponds to the desired output location (e.g., locations that are related by transform A) may not be perfectly aligned with the pixel locations within the input image. For example, the transform may map an output location to a location in the input image data that resides between two (or more, typically four) pixel locations in the input image. In this case, spatial transform engine 200 may pass data to interpolation processor 204 over path 210. Interpolation processor 204 may then perform intraframe interpolation between image data at the two pixel locations in the input image to produce data for the desired output location.

While this one-to-one transfer of image data between the input image and the output image may be performed to produce the entire output image, storing the data necessary to provide a one-to-one relationship between the output image and the input image may be memory intensive or inefficient. Therefore, transform A may subsample the input image data and only determine data for a subset of the output image locations, if desired. For example, transform processor 202 may determine output data for every 16, 32, or 64 pixels in the output image. However, this is merely illustrative. The data may be subsampled using any desired technique.

After transform processor 202 generates output data for each subsampled location, the output data may be sent to interpolation processor 204 over path 210. Interpolation processor 204 may then interpolate between the subsampled output pixels to generate data for any remaining locations within the output image (e.g., locations within the output image that were not subsampled). For example, if transform processor determined output data for every 16 pixels in the output image, interpolation processor 204 may interpolate the data to determine the values of pixels two through 16

(e.g, between pixels one and 17), pixels 18 through 32 (e.g., between pixels 17 and 33), etc. In this way, interpolation processor 204 may generate the data necessary to complete the output image, which may be output out of spatial transform engine 200 over path 212. Interpolation processor 204 may use linear interpolation or other interpolation methods, if desired.

While Equation 1 has been described as being a transform that defines each pixel in the output image in terms of its location in the input image, this is merely illustrative. If desired, transform processor 202 may define pixels in the input image in terms of its location in the output image. In general, any desired transform that relates a portion of the input to the output image may be used.

Figure 3:
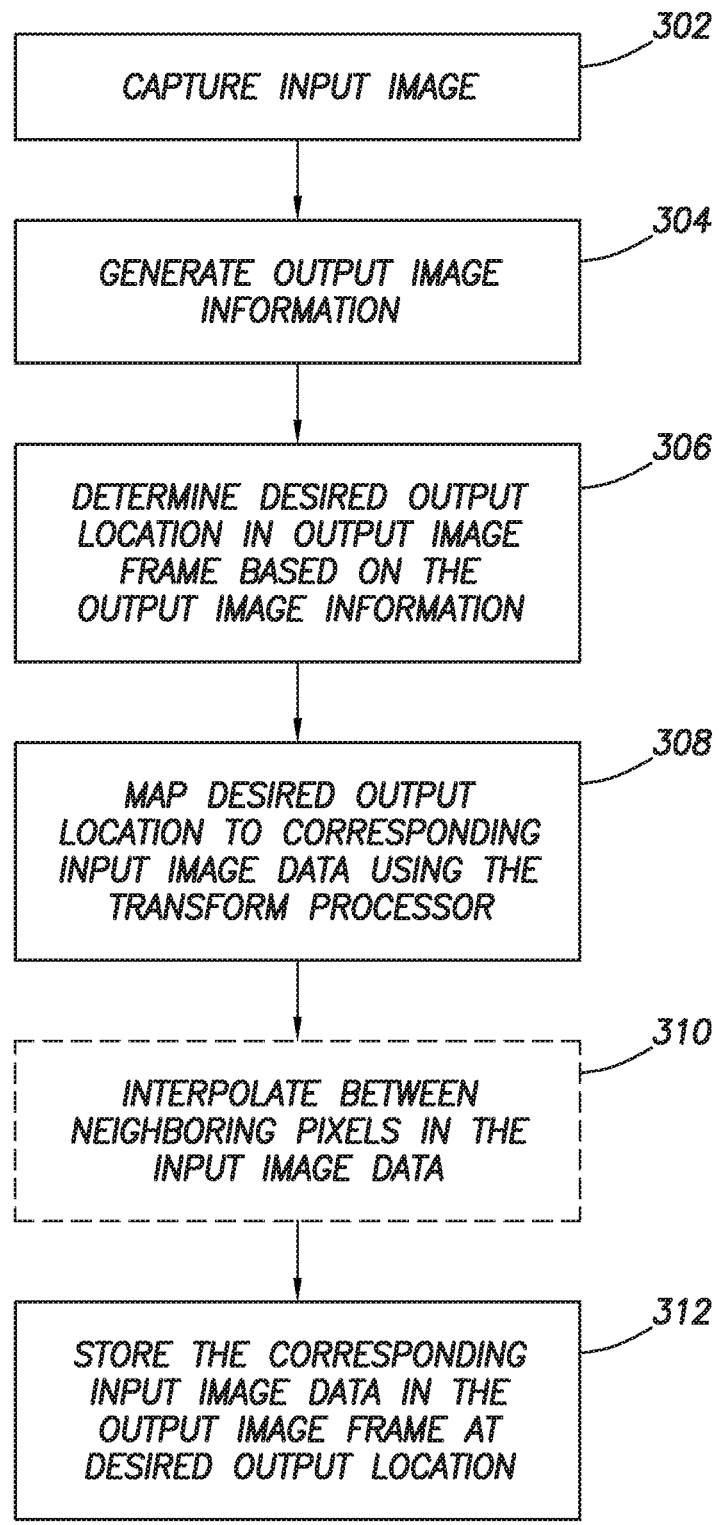
FIG. 3 is a flow chart of illustrative steps that may be performed by the spatial transform processor to transform input image data into a desired output image in accordance with an embodiment.

A flow chart of illustrative steps performed by the imaging system and spatial transform engine 200 is shown in FIG. 3. At step 302, input image data may be captured. The input image data may be captured by image sensor 36 or may be captured by an external device.

At step 304, processing circuitry, such as image processing circuitry 16 or processing circuitry 24, may then generate output image information based on a desired output image. For example, if a geometric transform is being performed, this output image information may indicate which portion(s) of the input image data are desired in the output image. In general, however, the output image information may include any information needed for spatial transform engine 200 to perform a desired transform on input image data.

At step 306, transform processor 202 may determine a desired output location in an output image frame based on the output image information. For example, transform processor 202 may determine a pixel within the output image frame for which data is desired.

At step 308, transform processor 202 may map the desired output location to corresponding input image data. As an example, transform processor 202 may map the desired output pixel to a location within the input image (e.g., a mapped location within the input image). However, this is merely illustrative. In general, any desired transform between the output image and a portion of the input image may be used. For example, transform processor 202 may map a location within the input image to an output pixel.

At step 310, spatial transform engine 200 may optionally use interpolation processor 204 to interpolate between neighboring pixels in the input image. This interpolation may be necessary when the mapped location within the input image is between two different pixels (e.g., there is no input image data directly in the mapped location). Interpolation processor 204 may interpolate between the image data of neighboring pixels, such as pixels surrounding the mapped location in the input image, using any desired interpolation technique, to produce interpolated input image data. For example, linear interpolation or a higher-order interpolation may be used.

At step 312, spatial transform engine 200 may store the desired input image data in the output image frame at the desired location. For example, if interpolation is required between neighboring pixels within the input image, spatial transform engine 200 may store the interpolated input image data (e.g., the interpolated data calculated at step 310) at the desired location in the output image. Alternatively, if interpolation is not required, step 310 may be skipped, and data at the mapped location within the input image may be stored directly in the output image.

Figure 4:
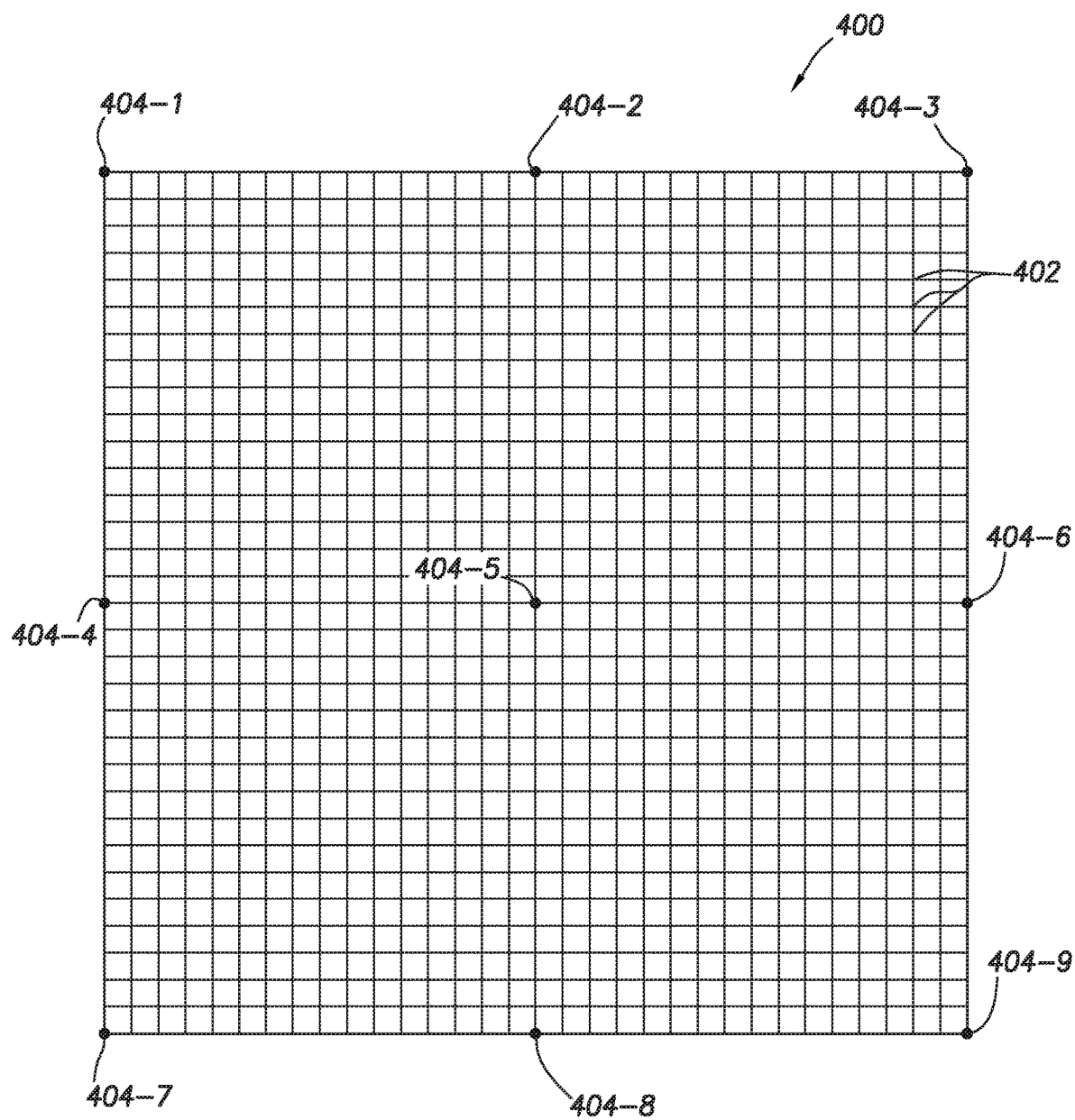
FIG. 4 is a diagram of an illustrative output image created by gathering desired input image data and interpolating between the desired input image data in accordance with an embodiment.

An example of an illustrative output image 400 is shown in FIG. 4. As shown in FIG. 4, output image 400 may include individual pixel locations 402. Output image 400 may include hundreds of thousands or millions of pixels (e.g., megapixels). In general, output image 400 may include any desired number of individual pixel locations 402. The desired number of pixels within output image 400 may be included in the output image information generated by the processing circuitry and sent to spatial transform engine 200 along path 206, as illustrated in FIG. 2.

If desired, transform processor 202 may map each individual output image pixel location 402 to a location in the input image. In other words, transform processor 202 may perform each of the steps shown in FIG. 3 for each individual output pixel location 402. However, storing transform information for each output pixel location (e.g., storing a look up table with a one-to-one relationship between the desired output locations and corresponding input image locations) may be memory intensive and inefficient in some applications. Instead, transform processor 202 may only map pixels 404-1 through 404-9 to locations in the input image, and store those values within output image 400. Following the storage of these values, spatial transform engine 200 may use interpolation processor 204 to perform interpolation between each of pixels 404. For example, as shown in FIG. 4, there may be 16 pixel locations between pixel 404-1 and 404-2. Interpolation processor 204 may perform a 16-step interpolation to determine the values for each of the pixel locations between 404-1 and 404-2. These values may then be stored within output image 400. Interpolation processor 204 may continue this process for each set of pixels 404 to determine interpolated pixel values for each pixel location 402 within output image 400.

Figure 5:
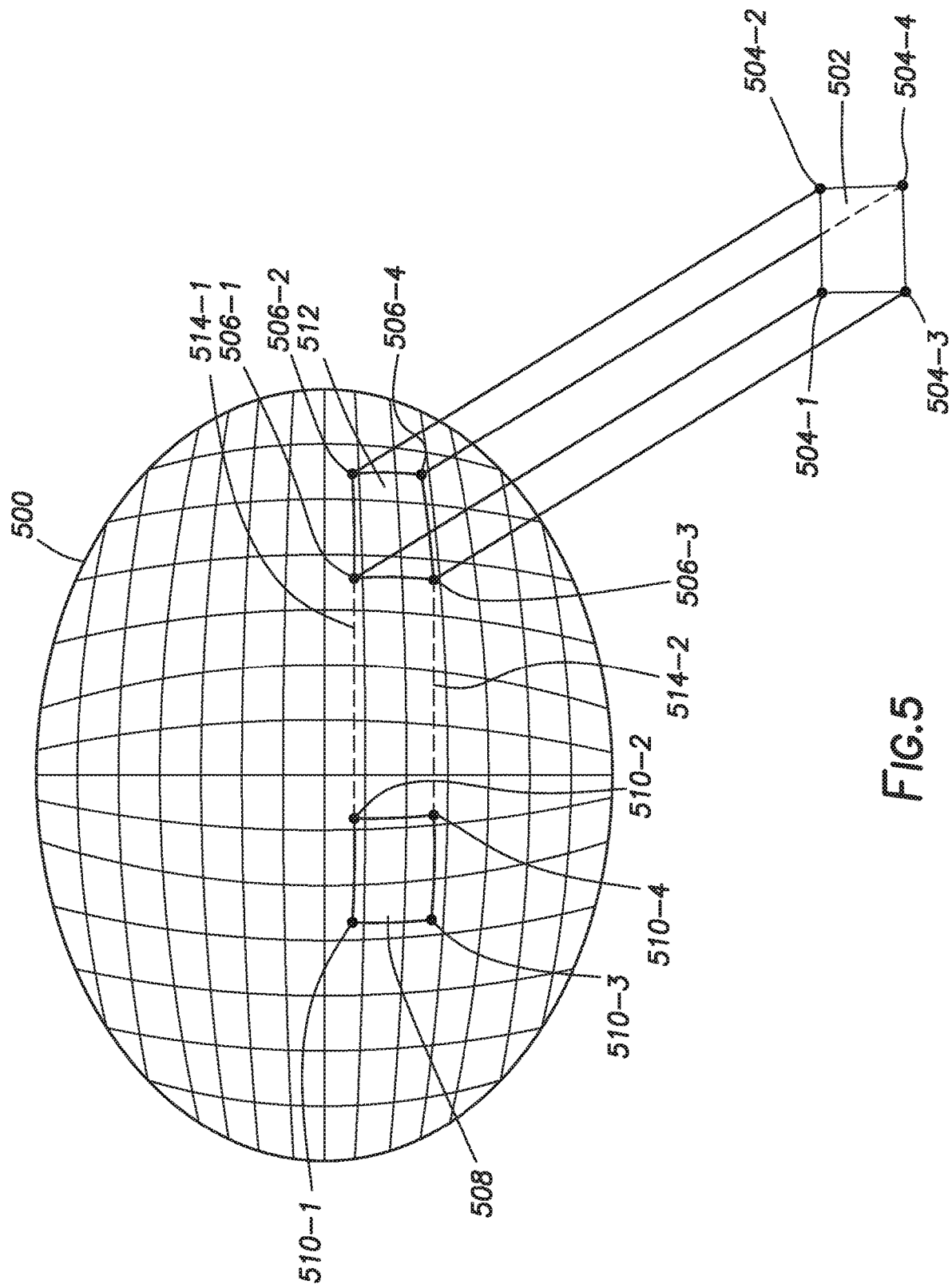
FIG. 5 is a diagram of illustrative first and second desired transform views within an input image frame in accordance with an embodiment.

In some applications, it may be desired to produce output images that correspond to different portions of the input image. These output images may also be referred to as output image views or transform views herein. An illustrative example of producing multiple output images from different locations of an input image is shown in FIG. 5. As shown in FIG. 5, input image 500 may correspond to an image taken using a wide-angle lens (e.g., a fisheye lens). As a result, input image 500 has curved lines that represent straight objects. In other words, input image 500 is distorted and/or warped.

It may be desired to produce a first transform view 502 to undistort or de-warp a first portion of input image 500. First transform view 502 may be produced according to the illustrative method of FIG. 3. As shown in FIG. 5, pixel locations 504 within transform view 502 may be mapped to locations 506 in input image 500. Locations 506 may not correspond directly to pixel locations within input image 500, so an intraframe interpolation operation may be required to calculate appropriate values for output image pixels 504. After this intraframe interpolation is performed, the interpolated values may be stored in transform view 502. As discussed above in connection with FIG. 4, an additional interpolation may be performed between output image pixels 504 to complete transform view 502, if necessary.

It may also be desired to produce a second transform view to undistort or de-warp a second portion of input image 500. The second transform view may be produced using the same method as described above in connection with first transform view 502. However, instead of using locations 506 from input image 500, transform processor 202 may gather the data needed for the second transform view from locations 510. The data from input image locations 510 and/or the data generated through interpolation may then be stored in an output image corresponding to the second transform view.

In some applications, it may be desired to be able to switch between first and second transform views, such as those described above in connection with FIG. 5. For example, a camera used for automotive purposes, such as a back-up camera, may capture an image using a wide-angle lens. This image may then be transformed to produce at least two different image views (e.g., a first view of the traffic behind the car and a second angled view focused on a trailer being towed), depending on the desired output. A user may, for example, use an interface to switch between these two views during vehicle operations. Alternatively, it may be desired to switch between different views captured by a security camera (e.g., to focus on different portions of a wide-angle scene). While switching between a first view and a second view may be performed by displaying a blank screen (e.g., a black screen) while transitioning between the two views or abruptly transitioning between the two views, a more gradual transition between the two views may be desired.

As shown in FIG. 5, it may be desired to gradually transition between first transform view 502, associated with first input image portion 512, to a second transform view associated with second input image portion 508. To perform this gradual transition, a discrete number of intermediate transform views may be generated between the first and second transform views. For example, to transition between two transform views in a 30 frames-per-second video sequence with a transition time of two seconds, 59 intermediate transforms may be used (e.g., in addition to the first and second transforms). However, this is merely an example. In general, any number of intermediate transforms may be used to transition between portions of a video captured at any desired frame rate and over any desired transition time.

The intermediate transform views may be associated with portions of input image 500 that are between first input image portion 512 and second input image portion 508. Moreover, the intermediate transform views may be formed from data from portions of input image 500 that are aligned with first image portion 512 and second input image portion 508 (e.g., these portions may be vertically aligned with first image portion 512 and second image portion 508, as indicated by lines 514-1 and 514-2). After the first image transform view, the second image transform view, and the intermediate transform views have been generated, all of the associated output images may be displayed in a continuous stream to a user, providing a gradual transition between the first and second transform views. However, this is merely illustrative. In general, the output images may be output to other circuitry, displayed to a user, or output to an external component.

Although the first and second transform views in FIG. 5 are associated with laterally offset portions of input image 500, this is merely illustrative. In general, the first and second transform views may be associated with any desired portion of a single input image. For example, the first and second transform views may be vertically offset, horizontally and vertically offset, or may at least partially overlap. Regardless of the relationship between the first and second transform views, intermediate transform views may be generated to provide a gradual transition between the first and second transform views.

Figure 6:
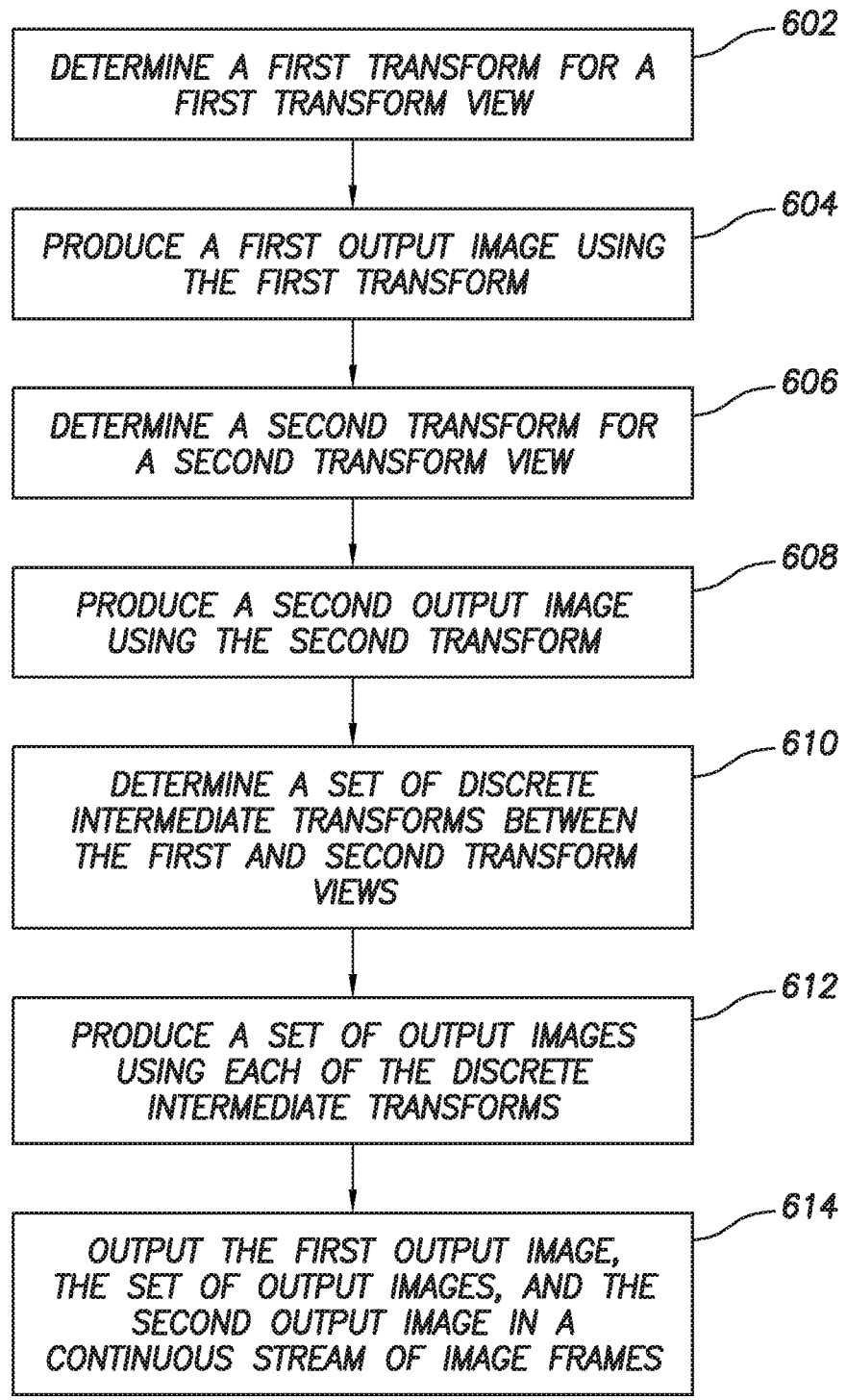
FIG. 6 is a flow chart of illustrative steps that may be performed by the spatial transform processor to create output images between first and second desired transform views and to output the images in a continuous stream of image frames in accordance with an embodiment.

A flow chart of illustrative steps performed by a processor, such as processor 16 or 24 of FIG. 1, to transition between two transform views gradually, is shown in FIG. 6.

At step 602, transform processor 202 may determine a first transform for a first transform view. As described above in connection with FIG. 2, transform processor 202 may generate the first transform according to Equation 1 based on the distortion of the lens and the desired zoom, rotation, and pan of the first transform view.

At step 604, spatial transform engine 200 may then produce a first output image using the first transform. After the first output image has been produced (e.g., data for each of the pixel locations within the first output image has been retrieved from the input image or calculated by interpolation processor 204), the first output image may be stored.

At step 606, transform processor 202 may determine a second transform for a second transform view. The second transform may be generated similarly to the first transform. However, the second transform view may be mapped to a different portion of the input image than the first transform view (e.g., the first and second transform views may generated from offset portions of the input image).

At step 608, spatial transform engine 200 may produce a second output image using the second transform. After the second output image has been produced (e.g., data for each of the pixel locations within the second output image has been retrieved from the input image or calculated through interpolation processor 204), the second output image may be stored.

At step 610, transform processor 202 may determine a set of discrete intermediate transforms associated with a set of discrete intermediate transform views between the first and second transform views. For example, to transition between two transform views in a 30 frames per second video sequence over a period of two seconds, 59 intermediate transforms may be determined (in addition to the first and second transforms at the beginning and the end of the sequence). The intermediate transform views may be evenly spaced between the first and second transform views to provide a gradual, continuous transition. Alternatively, the intermediate transform views may be staggered to make the transition appear faster or slower, if desired. In general, any set of discrete intermediate transforms may be selected.

At step 612, spatial transform engine 200 may produce a set of output images using each of the discrete intermediate transforms. Each output image of the set of output images may be associated with one of the discrete intermediate transform views.

At step 614, the first output image (corresponding to the first transform view), the set of intermediate output images (corresponding to the set of discrete intermediate transform views), and the second output image (corresponding to the second transform view) may be output in a continuous stream of image frames (e.g., the output images may be sequentially displayed). As a result, a gradual transition between the first transform view and the second transform view may be output.

Figure 7:
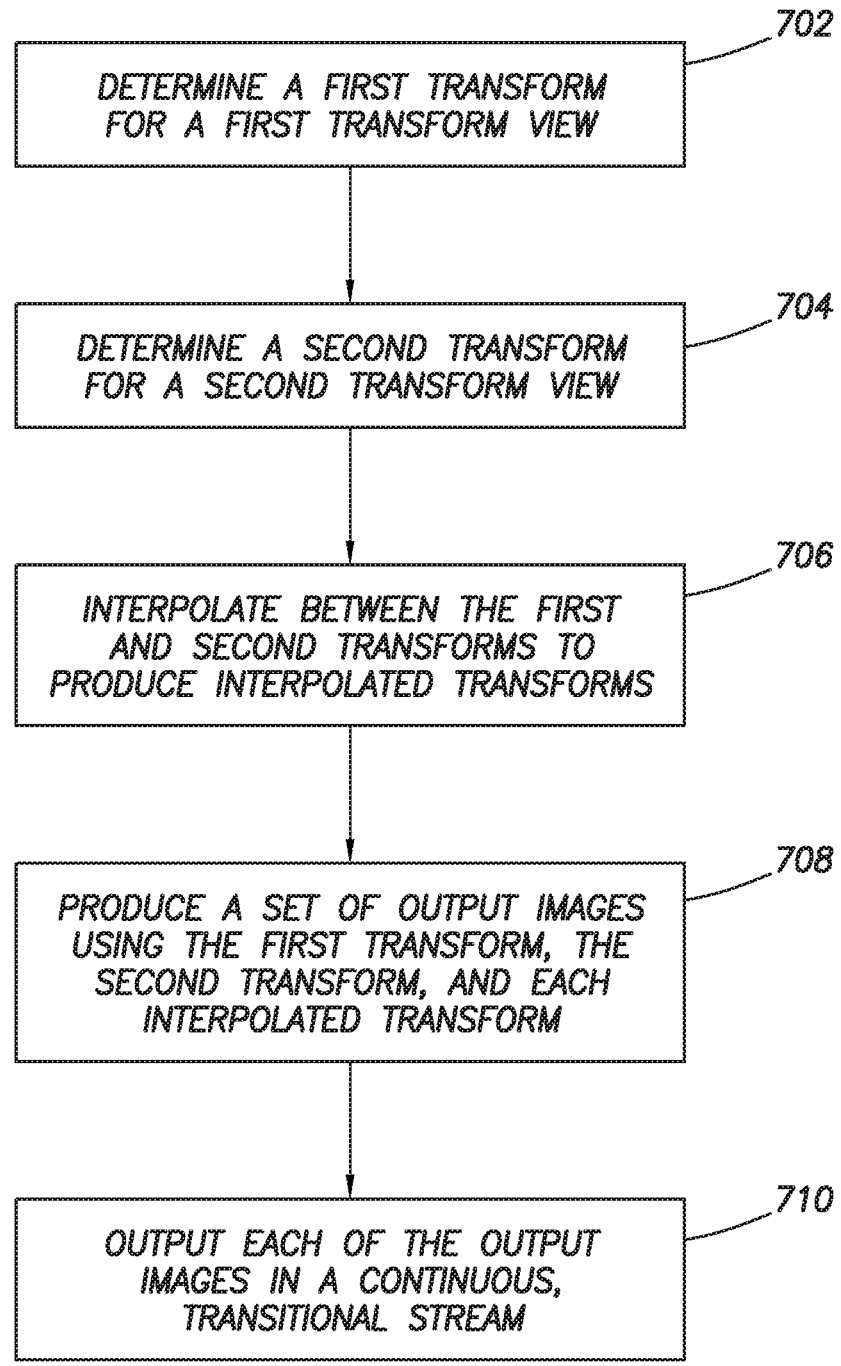
FIG. 7 is a flow chart of illustrative steps that may be performed by the spatial transform processor to produce interpolated transforms between first and second transform views, to produce a set of output images for each of the interpolated transforms, and to output the images in a continuous, transitional stream of image frames in accordance with an embodiment.

Although a set of discrete intermediate transforms and output images may be determined and produced between two transform views, it may be desirable to reduce the amount of storage necessary to perform a gradual transition between the two transform views. A flow chart of illustrative steps performed by a processor, such as processor 16 or 24 of FIG. 1, to gradually transition between two transform views in a more efficient manner, is shown in FIG. 7.

At step 702, transform processor 202 may determine a first transform for a first transform view. As described above in connection with FIG. 2, transform processor 202 may generate the first transform according to Equation 1 based on the distortion of the lens and the desired zoom, rotation, and pan of the first transform view.

At step 704, transform processor 202 may determine a second transform for a second transform view. As described above in connection with FIG. 2, transform processor 202 may generate the second transform according to Equation 1 based on the distortion of the lens and the desired zoom, rotation, and pan of the second transform view.

At step 706, interpolation processor 204 may interpolate between the first and second transforms to produce interpolated transforms. Interpolation processor 204 may perform this interpolation according to Equation 2:

$$I_{nn}(x,y)=B(x, y)*[nn/(N+1)]+A(x,y)*[1-(nn/(N+1))] \quad (2)$$

where $I_{nn}$ is one of a set of nn intermediate transforms, A is a first transform, B is a second transform, x and y are coordinates within transforms A and B, and N is the number of intermediate transforms. Transforms A and B may be computed according to Equation 1, or according to any other desired transform equation. Although Equation 2 is an example of a linear interpolation that may be performed by interpolation processor 204, this is merely illustrative. In general, interpolation processor 204 may interpolate between transforms A and B in any desired manner to produce the interpolated transforms. For example, the interpolations may be staggered or performed based on a non-linear curve to make the transition appear faster or slower, if desired. The type of interpolation may be selected to increase the accuracy of the interpolation, to increase the speed of the interpolation and/or the transition between transform views, or to provide an optimal visual effect.

Because the interpolated transforms are calculated iteratively, intermediate transforms do not need to be precomputed and stored (as may be the case with the intermediate transforms disclosed in connection with FIG. 6). Instead, at step 708, spatial transform engine 200 may produce an output image for each of the interpolated transforms as the transforms are calculated (in addition to producing output images for the first and second transforms). In this way, a gradual transition between two or more transform views may be made less memory intensive and more efficient.

At step 710, the output image associated with the first transform, the output images for each of the interpolated transforms, and the output image associated with the second transform may be output in a continuous stream. The continuous stream of images provides a gradual transition between the first transform view and the second transform view.

Although step 708 is depicted as being prior to step 710, this is merely illustrative. If desired, output images may be output immediately after they are produced, eliminating or reducing the need to store the output images. In this way, one of the interpolation transforms may be calculated, an output image associated with the interpolation transform may be produced (after which time the interpolation transform may be deleted), and the output image may be output (after which time the output image may be deleted). This process may further increase the efficiency of producing gradual transitions between transform views.

In some instances, it may be desired to further reduce the amount of storage necessary to perform the gradual transition between the two transform views. To do so, the resolution of the interpolated transforms may be reduced with respect to the transform views between which the gradual change is occurring. For example, the first and second transform views may have a first resolution and each of the interpolated transforms may have a second resolution that is less than the first resolution. The second resolution may be half of the first resolution, a quarter of the first resolution, or less than a quarter of the first resolution. However this is merely illustrative. In general, the second resolution may be any desired proportion of the first resolution. Moreover, while changing the resolution of interpolated transforms has been described, the resolution of any intermediate transforms may be reduced with respect to the two transform views. For example, the discrete intermediate transforms described in connection with FIG. 6 may also have reduced resolution, if desired.

In some cases, it may be desired to provide a gradual transition between two transform views without calculating, storing, and reading out intermediate transform views. For example, first and second transform views may be determined according to the method of FIG. 3 (or any other desired method of transforming an input image). The first transform view may then be displayed. To gradually transition between the first transform view and the second transform view, the first transform view may be slid out of the frame (e.g., gradually moved to either the right or the left of the display), and the second transform view may be slid into the frame. This method of gradually transitioning between first and second transform views may be most effective when the two transform views correspond to overlapping or directly adjacent portions of the input image. However, this method may be used to gradually transition between any transform views, if desired.

Although the preceding examples describe gradual transforms with respect to geometric distortion correction (e.g., undistorting or de-warping an input image), these gradual transforms may be applied to any two instances of image mapping operations. For example, gradual transitions may be applied between two instances of rotated images, panned images, tilted images, or zoomed images. In general, gradual transitions may be applied between any two image transforms by generating a discrete number of intermediate transforms or by generating interpolated transforms.

Various embodiments have been described illustrating imaging systems having transform circuitry that is capable of gradually transitioning between at least two transform views. Various methods for producing intermediate transforms between at least two transform views have also been described.

In various embodiments, an imaging system may use an image sensor to generate an input image. A transform engine may be coupled to the image sensor and may apply first and second transforms to the input image to produce respective first and second transform views. The transform engine may also produce intermediate transform views (e.g., using intermediate transforms) between the first and second transform views. The transform engine may then output the first transform view, the intermediate transform views, and the second transform view in a continuous stream of images to provide a gradual transition between the first and second transform views.

The transform engine may produce each of the intermediate transform views using a different intermediate transform. The transform engine may further interpolate between first image data at a first location in the input image and second image data at a second location in the input image to produce interpolated image data that may be stored in at least one transform view. For example, the transform engine may interpolate between image data associated with neighboring pixels in the input image to produce data for at least one of the output images. Alternately or additionally, the transform engine may interpolate between the first transform and the second transform to generate interpolated transforms, which may be used by the transform engine to produce the intermediate transform views. If desired, the transform engine may linearly interpolate between the first and second transforms to generate the interpolated transforms. The various transforms applied to the input image by the transform engine may be geometric transforms and may be used to de-warp different portions of the input image. At least some of these de-warped portions may overlap, if desired. In general, the first transform view and the second transform view may have a first resolution, and the intermediate transform views may have a second resolution that is less than the first resolution.

In accordance with an embodiment, transform circuitry may be used to determine a first transform for a first transform view. The transform circuitry may apply the first transform to an input image to produce a first output image corresponding to the first transform view. The transform circuitry may then determine a second transform using a second transform view and may apply the second transform to the input image to produce a second output image corresponding to the second transform view. The transform circuitry may then gradually transition between the first transform view and the second transform view.

The transform circuitry gradually transition between the first transform view and the second transform view by determining a set of discrete intermediate transforms between the first and second transform views and applying the set of discrete intermediate transforms to the input image to produce a set of intermediate output images. The first output image, intermediate output images, and the second output image may then be sequentially displayed to gradually transition between the first and second transform views.

The first and second transforms may be used to de-warp first and second portions of the input image, thereby producing the first and second output images. De-warping the first and second portions of the input image may be performed by selectively gathering data from the input image. The gathered data may be used to form at least first and second portions of the first output image and at least first and second portions of the second output image. In some cases, the transform circuitry may interpolate between the first portion of the first output image and the second portion of the first output image to generate first additional data, which may be used to form an intermediate portion of the first output image between the first and second portions of the first output image. The transform circuitry may also interpolate between the first portion of the second output image and the second portion of the second output image to generate second additional data, which may be used to form an intermediate portion of the second output image between the first and second portions of the second output image. The transform circuitry may generate the first transform based on the distortion of the lens used to capture the input image. Alternatively or additionally, the transform circuitry may gradually transition between the first transform view and the second transform view by displaying the first transform view on a display, gradually moving the first transform view across the display (e.g., sliding the first transform view out of a frame of the display), gradually display portions of the second transform view while sliding the first transform view out of the frame, and displaying the entire transform view on the display.

In various embodiments, transform circuitry may use a transform processor to determine a first transform for a first transform view and a second transform for a second transform view. The transform circuitry may then use an interpolation processor to interpolate between the first transform and the second transform to produce interpolated transforms. The transform circuitry may produce a set of output images using the first transform, each interpolated transform, and the second transform. The set of output images may be output to an external component, sequentially displayed, or output in a continuous stream of images to produce a gradual transition between the first transform view and the second transform view.

After producing the set of output images, the set of output images may be stored and then outputted. Alternatively, each output image may be output immediately after it has been produced. Interpolating between the first and second transforms may be performed by linearly interpolating between the transforms. Each of the transforms may de-warp different portions of the input image, thereby forming the set of output images.

The foregoing is merely illustrative and various modifications can be made to the described embodiments. The foregoing embodiments may be implemented individually or in any combination.

What is claimed is:

1. An imaging system comprising:
   an image sensor that generates an input image from a scene;
   a transform engine that receives the input image and is configured to apply a first transform to the input image to produce a first transform view, apply a second transform to the input image to produce a second transform view, and apply intermediate transforms to the input image to produce intermediate transform views, wherein the first transform view corresponds with a first portion of the input image, the second transform view corresponds with a second portion of the input image that is different from the first portion, the intermediate transform views correspond with portions of the input image between the first portion and the second portion, and the transform engine is configured to output the first transform view, the intermediate transform views, and the second transform view in a continuous stream of images.

2. The imaging system defined in claim 1 wherein the transform engine is configured to use a different one of the intermediate transforms to produce each of the intermediate transform views.

3. The imaging system defined in claim 2 wherein the transform engine is configured to interpolate between the first image data and the second image data to produce interpolated image data, and wherein the transform engine is configured to store the interpolated image data as at least one of the intermediate transform views.

4. The imaging system defined in claim 1 wherein the transform engine is configured to interpolate between the first transform and the second transform to generate the intermediate transforms.

5. The imaging system defined in claim 4 wherein the transform engine is configured to linearly interpolate between the first transform and the second transform to generate the intermediate transforms.

6. The imaging system defined in claim 4 wherein the input image comprises first image data corresponding to a first location in the input image and second image data corresponding to a second location in the input image, wherein the transform engine is configured to interpolate between the first image data and the second image data to produce interpolated image data, and wherein the transform engine is configured to store the interpolated image data as at least one of the intermediate transform views.

7. The imaging system defined in claim 1 wherein the first transform, the second transform, and the intermediate transforms are geometric transforms.

8. The imaging system defined in claim 7 wherein transform engine is configured to use the first transform, the second transform, and the intermediate transforms to de-warp different portions of the input image.

9. The imaging system defined in claim 1 wherein the first transform view and the second transform view have a first resolution, and the intermediate transform views have a second resolution that is less than the first resolution.

10. A method of transforming an input image from an image sensor using transform circuitry, the method comprising:
    determining a first transform for a first transform view that corresponds with a first portion of the input image;
    with the transform circuitry, applying the first transform to the input image to produce a first output image of the first transform view;
    determining a second transform for a second transform view that corresponds with a second portion of the input image that is different from the first portion;
    with the transform circuitry, applying the second transform to the input image to produce a second output image of the second transform view; and
    gradually transitioning between the first transform view and the second transform view.

11. The method defined in claim 10 wherein gradually transitioning between the first transform view and the second transform view comprises:
    determining discrete intermediate transforms for intermediate transform views that correspond with portions of the input image between the first portion and the second portion;
    with the transform circuitry, applying the discrete intermediate transforms to the input image to produce intermediate output images of the intermediate transform views; and
    sequentially displaying the first output image, each of the intermediate output images, and the second output image.

12. The method defined in claim 11 wherein using the first transform to produce the first output image and using the second transform to produce the second output image respectively comprise de-warping the first and second portions of the input image.

13. The method defined in claim 12 wherein de-warping the first and second portions of the input image comprises using the transform circuitry to selectively gather data from the input image, using the gathered data to form at least first and second portions of the first output image, and using the gathered data to form at least first and second portions of the second output image.

14. The method defined in claim 13 further comprising:
    with the transform circuitry, interpolating between the first portion of the first output image and the second portion of the first output image to generate first interpolated data;
    using the first interpolated data, forming an intermediate portion of the first output image between the first and second portions of the first output image;
    with the transform circuitry, interpolating between the first portion of the second output image and the second portion of the second output image to generate second interpolated data; and
    using the second interpolated data, forming an intermediate portion of the second output image between the first and second portions of the second output image.

15. The method defined in claim 10 wherein determining a first transform for a first transform view comprises using the transform circuitry to generate the first transform based on lens distortion.

16. The method defined in claim 10 wherein gradually transitioning between the first transform view and the second transform view comprises:
    displaying the first transform view on a display;
    gradually moving the first transform view across the display;
    while gradually moving the first transform view across the display, gradually displaying portions of the second transform view; and
    after the first transform view has moved across the entire display, displaying the entire second transform view on the display.

17. A method of transforming an input image from an image sensor using transform circuitry that comprises a transform processor and an interpolation processor, the method comprising:
    with the transform processor, determining a first transform for a first transform view that corresponds with a first portion of the input image;
    with the transform processor, determining a second transform for a second transform view that corresponds with a second portion of the input image that is different from the first portion;
    with the interpolation processor, interpolating between the first transform and the second transform to produce interpolated transforms for interpolated transform views that correspond with portions of the input image between the first portion and the second portion; and
    with the transform circuitry, producing a set of output images using the first transform, each of the interpolated transforms, and the second transform.

18. The method defined in claim 17 wherein producing the set of output images using the first transform, the second transform, and each of the interpolated transforms comprises producing the set of output images and storing the set of output images.

19. The method defined in claim 17 further comprising:
    outputting each of the output images immediately after it has been produced.

* * * * *